United States Patent [19]
Belcher

[11] Patent Number: 5,248,218
[45] Date of Patent: Sep. 28, 1993

[54] SNAKE CLEANABLE FLUID FLOW SYSTEM

[76] Inventor: Walter C. Belcher, 20221 Melvin, Livonia, Mich. 48152

[21] Appl. No.: 907,630

[22] Filed: Jul. 2, 1992

[51] Int. Cl.⁵ .............................. F16L 45/00; B08B 9/04
[52] U.S. Cl. ........................................ 405/43; 405/51; 285/156; 138/37
[58] Field of Search ............... 405/43, 45, 47, 51; 285/131, 155, 156, 150; 138/37, 94

[56] References Cited

U.S. PATENT DOCUMENTS

| 186,411 | 1/1877 | Church | 138/37 |
|---|---|---|---|
| 419,694 | 1/1890 | Loyd | 138/37 |
| 2,284,937 | 6/1942 | Wood | 285/210 |
| 2,506,206 | 5/1950 | Fulton | 285/155 X |
| 2,525,399 | 10/1950 | Collison | 285/210 |
| 4,165,592 | 8/1979 | Blankenship | 285/156 X |
| 4,391,551 | 7/1983 | Belcher | 405/43 |
| 4,974,280 | 12/1990 | Ward | 15/104.33 X |

FOREIGN PATENT DOCUMENTS 477289 10/1975 U.S.S.R. .................. 285/156

Primary Examiner—Dennis L. Taylor
Assistant Examiner—Arlen L. Olsen
Attorney, Agent, or Firm—Krass & Young

[57] ABSTRACT

A snake cleanable fluid flow system is provided which incorporates a first fitting in the form of a clean-out pipe and a second fitting in the form of a baffled tee. The two fittings may be formed integrally. The clean-out pipe is in the form of a tee with the leg of the tee being divided by an interior partition into first and second fluid passageways. The crossbar of the tee is also longitudinally bisected by a partition to form second and third fluid passageways. The partitions are disposed at right angles to each other so that the first and second fluid passageways are in communication with both the third and fourth fluid passageways. A snake may be selectively directed down various paths formed by the four fluid passageways. The baffled tee fitting has a baffle which will divert a snake out either end of its crossbars. The various baffles and partitions facilitate cleaning the entire flow system by deflecting the snake inserted into the clean-out pipe and baffled tee into a preselected one of a variety of possible paths formed by the various partitions and the baffles. The clean-out pipe may be positioned in the interior of a building when the fluid flow system is used as a drainage system.

10 Claims, 3 Drawing Sheets

SNAKE CLEANABLE FLUID FLOW SYSTEM

BACKGROUND OF THE INVENTION

1. Field of the Invention

This invention relates to the field of drainage systems designed to direct a flow of ground water from proximate a building foundation, and more particularly to such a drainage system incorporating at least one clean-out pipe accessible from the interior of the building.

2. Relevant Prior Art

For purposes of the drawings and description which follow, the subject invention is presented as part of a fluid flow system specifically adapted for use in a drainage system used to drain water from the ground next to a building foundation. Such drainage systems are in common usage and are utilized to protect such foundations from water seepage, water pressure, heaving due to freezing water, and various other problems commonly known to those persons versed in the art.

Drainage systems for removing water from proximate a building foundation incorporate seepage lines in the form of perforated drain pipes, disposed around a building foundation, through which ground water drains. Sand, minerals and other impurities in the ground enter the perforated drain pipes with the ground water and periodically contribute to blockage of the drain system.

It is therefore common in drainage systems to provide a clean-out fitting specifically adapted to facilitate insertion of a snake into a portion of the drainage system. Snakes employed for such purpose often are cylindrical and may be hand driven or motor propelled so as to rotate while being inserted into the drainage system. Other commonly used snakes are in the form of a long slender piece of flexible steel.

Drainage systems usually incorporate straight pipes and fittings of various configurations which serve to connect the pipes. Common types of fittings are: elbow fittings which contain a passageway having an axis that curves 90 degrees, tee fittings which have a straight first passageway and a second passageway intersecting the first passageway at right angles, and fittings having a passageway on an axis that curves 45 degrees or 135 degrees or which contain a first passageway having an axis at such angles as 45 degrees and 135 degrees to the axis of a second passageway.

A common problem with drainage systems is that the semirigid snakes are used to clean such systems can not selectively clean predetermined parts of the drainage system. Another common problem with such drainage systems is that when a snake enters a tee at right angles to a passageway, it tends to be unable to negotiate the required turn in the passageway and becomes jammed. In other instances, the snake may enter either end of the passageway without the user being able to select the direction of the snake travel.

In my U.S. Pat. No. 4,391,552, the disclosure of which is incorporated herein by reference, I disclosed and claimed a snake cleanable fluid flow system incorporating a first fitting in the form of a clean-out elbow and a second fitting in the form of a tee. Each of the fittings has a first passageway open at each end and a second passageway intersecting the first passageway. The clean-out elbow is provided with a baffle which selectively directs a snake inserted in its second passageway into a predetermined end of the first passageway. The tee also has a baffle which diverts a snake inserted into either end of its first passageway into its second passageway. The tee and clean-out elbow are connected by a pipe and a partitioned pipe is connected to the second passageway of the clean-out elbow so as to facilitate insertion of a snake. The baffles facilitate cleaning the fluid flow system by deflecting the snake inserted in the clean-out elbow and tee, so as to allow the snake to follow a preselected path.

While the above references U.S. patent does provide a snake cleanable fluid flow system in which all parts of the system are accessible by a standard clean-out snake via one or more clean-out elbows of the type described, it does suffer from certain disadvantages. In the system as disclosed and depicted in FIG. 1, of the U.S. Pat. No. 4,391,552, the clean-out elbows are provided at locations in the drainage system exterior of the building. While the open end of the clean-out elbow may be covered by a removable cap, such a cap may become dislodged or, due to exposure to the elements, may become corroded or warped and very difficult to remove. Should the cap become dislodged, the opening to the elbow fitting will become exposed and dirt, rocks, leaves and other debris may become lodged therein. A sufficient accumulation of such debris may cause premature clogging of the clean-out elbow, thus leading to inefficient operation of the drainage system. On the other hand, should the removable cap become corroded or warped and difficult to remove, the utility of the clean-out system becomes compromised.

It would be desirable to provide a drainage system of the type described with a clean-out pipe disposed interiorally of the building to permit easy and accessible clean-out thereof.

It would also be desirable to provide a clean-out pipe fitting usable in a drainage system of the type described which may be located in the interior of the building.

SUMMARY OF THE INVENTION

The invention described and claimed herein provides a fitting for use in a snake cleanable drain system configured to include a tubular leg longitudinally bisected by a first interior wall to define first and second fluid passageways therethrough. The fitting is in the form of a "T" and further provides a tubular crossbar in fluid communication with the tubular leg and longitudinally bisected by a second interior wall to define third and fourth fluid passageways therethrough. The first interior wall terminates proximate the second interior wall at right angles thereto. Thus, the first and second fluid passageways are in fluid communication with the third and fourth passageways. If a clean-out snake is inserted into the first fluid passageway, it may be selectively directed into either the third or fourth fluid passageway and diverted out a first arm of the crossbar. If a clean-out snake is inserted into the second fluid passageway, it may then be directed out a second arm of the crossbar via either the third or fourth fluid passageways. Hence, the intersection of the first and second interior walls effectively divides the interior of the fitting to provide four possible routes for a clean-out snake inserted into an open end thereof.

In a preferred embodiment of the instant invention, the fitting further comprises a second tee having a leg thereof affixed to an end of the crossbar of the first tee has a tubular cross arm which is disposed transversely to the tubular leg of the first tee. The second tee is provided with a interior baffle for deflecting a snake entering the tubular leg thereof via the third fluid passageway into one arm of its tubular crossbar and a snake entering the leg thereof via fourth passageway into the other arm of the tubular crossbar.

The instant invention also comprises a drainage system of the type described which incorporates the novel fittings disclosed above. Depending on the configuration of the drainage system, one or more of the tee fittings bisected by interior walls may be used as a clean-out pipe. The one or more clean-out pipes may be joined with one or more baffled tee fittings such that the entire length of the drainage system, the user may selectively clean a large section of the system by selecting the location in which the snake is inserted. As the snake enters each fitting, it is deflected in a predetermined direction so as to clear a suspected blockage believed to exist at a predetermined location. The entire system may be cleaned out by inserting the snake into the appropriate fluid passages of the clean-out pipes.

BRIEF DESCRIPTION OF THE DRAWINGS

The various embodiments, uses and advantages of the herein described invention may best be understood with reference to the following drawings in which.

DETAILED DESCRIPTION OF THE PREFERRED EMBODIMENT

Throughout the following detailed description, like numerals are used to refer to identical elements of the invention shown in multiple figures thereof.

Figure 1:
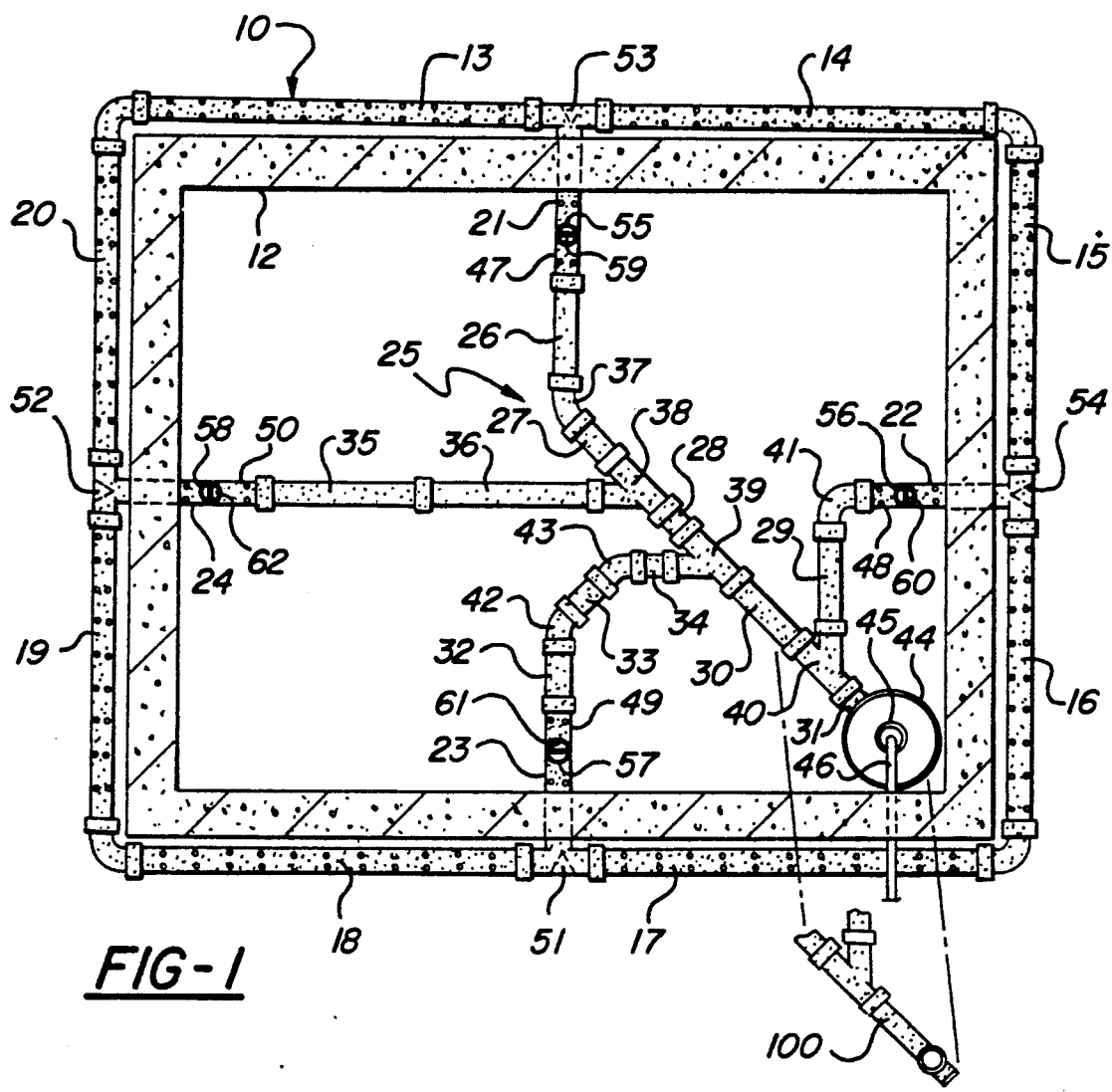
FIG. 1 is a plan view of a snake cleanable drainage system embodying the principles of the present invention.

Referring now to the drawings and in particular to FIG. 1, a fluid flow system 10 is illustrated embodying the principles of the instant invention. For purposes of this specification, the system 10 is in the form of a drainage system for draining water from around the foundation 12 of a building.

The system 10 includes several conventional drainage system elements, including perforated pipes 13 through 20 outside the foundation 12, perforated pipes 21 through 24 which extend under the foundation 12, and interior drain network 25 which drains water from the perforated pipes 21 through 24 to a conventional sump basin 44 in which is located a conventional sump pump 45 which pumps the water out of the sump basin 44 through a sump line in the form of a pipe 46 through the foundation 12 to a suitable remote location away from the foundation 12.

The fluid flow system 10 illustrated in FIG. 1 also includes four clean-out pipes 47 through 50 and four baffled tee fittings 51 through 54 which incorporate the principles of the instant invention and which connect perforated pipes 13 through 24. Clean-out pipes 47 through 50 are configured to have partitioned pipes 55 through 58 positioned on top of the respective perforated pipes 21 through 24. The interiors of partitioned pipes 55 through 58 are bisected by longitudinal partitions 59 through 62 parallel to their longitudinal axes.

Figure 2:
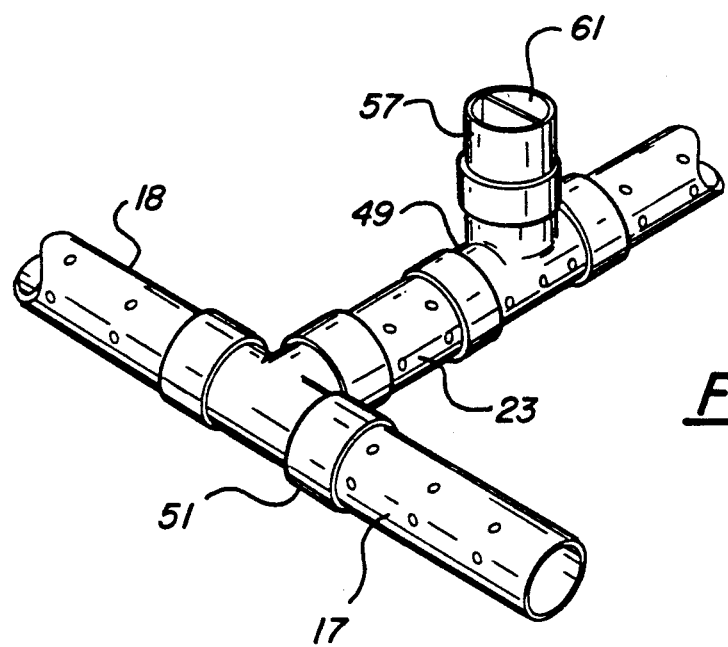
FIG. 2 is a partial perspective view of the drainage system of FIG. 1.

Most of the fluid flow system 10 is positioned beneath the surface of the ground outside the foundation 12 in a manner common to persons versed in the art and as disclosed in my aforementioned U.S. Pat. No. 4,391,551. However, in the system of the instant invention, the clean-out pipes 47 through 50 are located within the interior of the building, rather than outside. Hence, partitioned pipes 55 through 58 are provided of a suitable length to extend above the bottom surface of the building interior such as, for example, a basement floor, in order for them to be accessible to a clean-out snake. This is illustrated in FIG. 2, which is a perspective view of a clean-out pipe 49 showing its location relative to perforated pipes 17, 18 and 23 and baffled tee fitting 51. As depicted in FIG. 2, clean-out pipe 59 is comprised of partitioned pipe 57 formed integrally on perforated pipe 23 to form a T-configured fitting. Clean-out pipe 49 may be provided as a separate fitting from baffled tee fitting 51 or may be formed integrally therewith.

While in the illustrated embodiment each of the various fittings 47 through 54, and 37 through 43 are illustrated as having an enlarged end in which one end of a pipe may be inserted, each of the pipes being the same outside diameter from end to end, persons versed in the art will appreciate that the respective pipes could be made with enlarged ends for connection to the various fittings without departing from the spirit of the invention. For convenience in illustration, all of the pipes in the illustrated embodiment have the same inside and outside diameter and are cylindrical. The various pipes may be of any suitable material. At the present time, polyvinyl chloride, commonly known as PVC, is a very satisfactory material for the construction of pipes and fittings of the type illustrated in the system 10. PVC is quite rigid and long lasting, but is easy to cut and connect to adjoining sections. It should be understood that the system could be fabricated with metallic or ceramic pipe as well as various polymeric materials.

Figure 3:
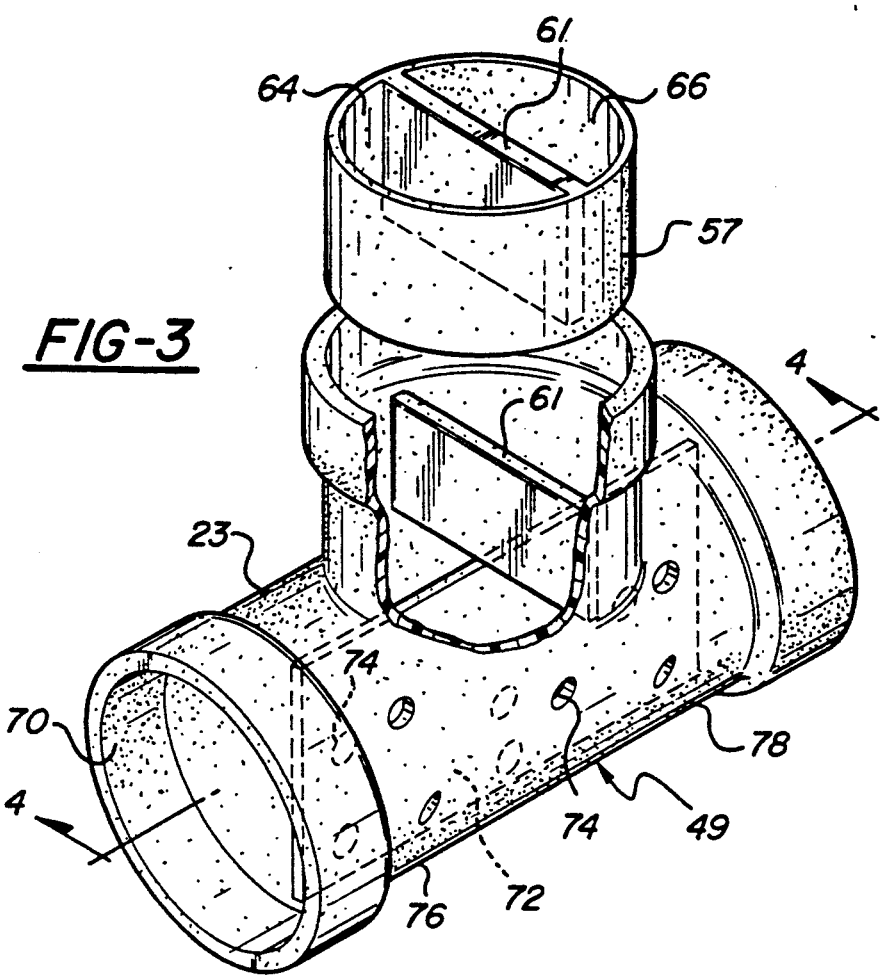
FIG. 3 is a partially cut-away perspective view of a partitioned clean-out pipe structured in accord with the present invention.
Figure 4:
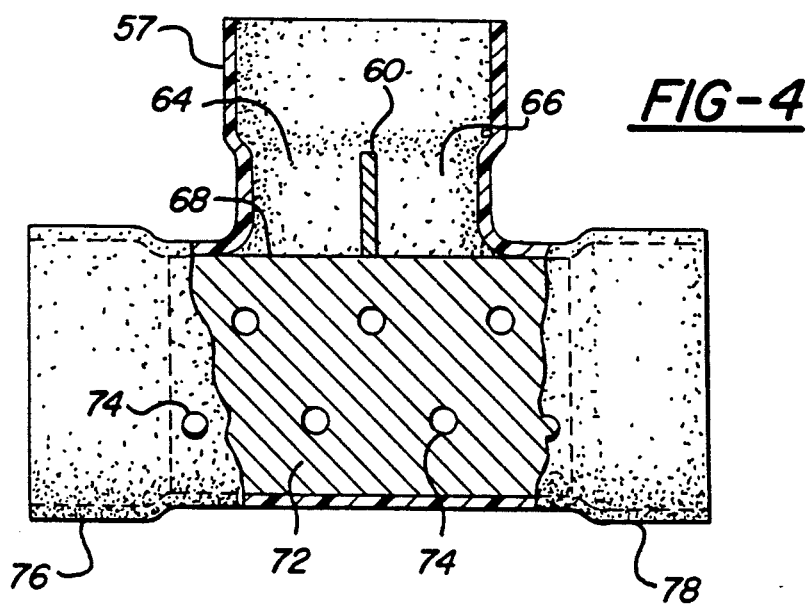
FIG. 4 is a partial cross-sectional view of the clean-out pipe of FIG. 3 taken along line 4—4.

As shown in FIG. 3, the clean-out pipe fitting 49 is the first fitting shown in detail in the drawings and it includes a first fluid passageway 64 and a second fluid passageway 66 formed by longitudinal partition 60 within partitioned pipe 57. Clean-out pipe 49 is configured to form a tee fitting, perforated pipe 23 forming the crossbar of the tee and partitioned pipe 57 forming the leg of the tee. The interior of perforated pipe 23 is longitudinally bisected by partition 68 so as to form a third fluid passageway 70 and a fourth fluid passageway 72 as may be seen by an examination of FIGS. 3 and 4. Partition 61 within partitioned pipe 57 is disposed at right angles to partition 68 within perforated pipe 23, and terminates proximate thereto. Either or both partitions 60 and 68 may be formed with perforations 74 therethrough configured in a size range to permit the passage of fluid therethrough and to prevent the passage of a clean-out snake therethrough. If partition 60 is formed with perforations 74 therethrough, it may extend down on either side of partition 68 for a substantial portion of the diameter of perforated pipe 23. The particular point at which partition 60 terminates is not critical so long as it terminates at such a point that the first and second fluid passageways 64, 66 are in fluid communication with the third and fourth fluid passageways 70, 72, and so that a snake directed down either first or second fluid passageway 64,66 may be easily directed into either third or fourth fluid passageway 70,72.

The crossbar formed by perforated pipe 23 has two arms 76 and 78. By selectively directing a clean-out snake down either first or second fluid passageway 64,66, the snake will be diverted into either arm 76 or 78 as desired. Alternatively, partitions 60 may be configured with inclined faces to facilitate direction of the snake into either arm 76 or 78.

If the snake is selectively directed down, for example, first fluid passageway 64, it will be diverted into arm 76 through either third fluid passageway 70 or fourth fluid passageway 72 as desired. Similarly, if a clean-out snake is selectively directed down second fluid passageway 66, it will be diverted into second arm 78 down either third fluid passageway 70 or fourth fluid passageway 72. Thus, the operator has the option of directing a clean-out snake into one of four possible paths. The first path is formed by first fluid passageway 64 and third fluid passageway 70; the clean-out snake will be directed through and out the left side of first arm 76. The second path is formed by first fluid passageway 64 and fourth fluid passageway 72; the snake will be directed through and out the right-hand side of first arm 76. The third path is formed by second fluid passageway 66 and third fluid passageway 70; the snake will be directed out and through the left-hand side of second arm 78. Finally, the fourth path will be formed by second fluid passageway 66 and fourth fluid passageway 72; the snake will be directed down and through the right-hand side of the second arm 78.

Figure 5:
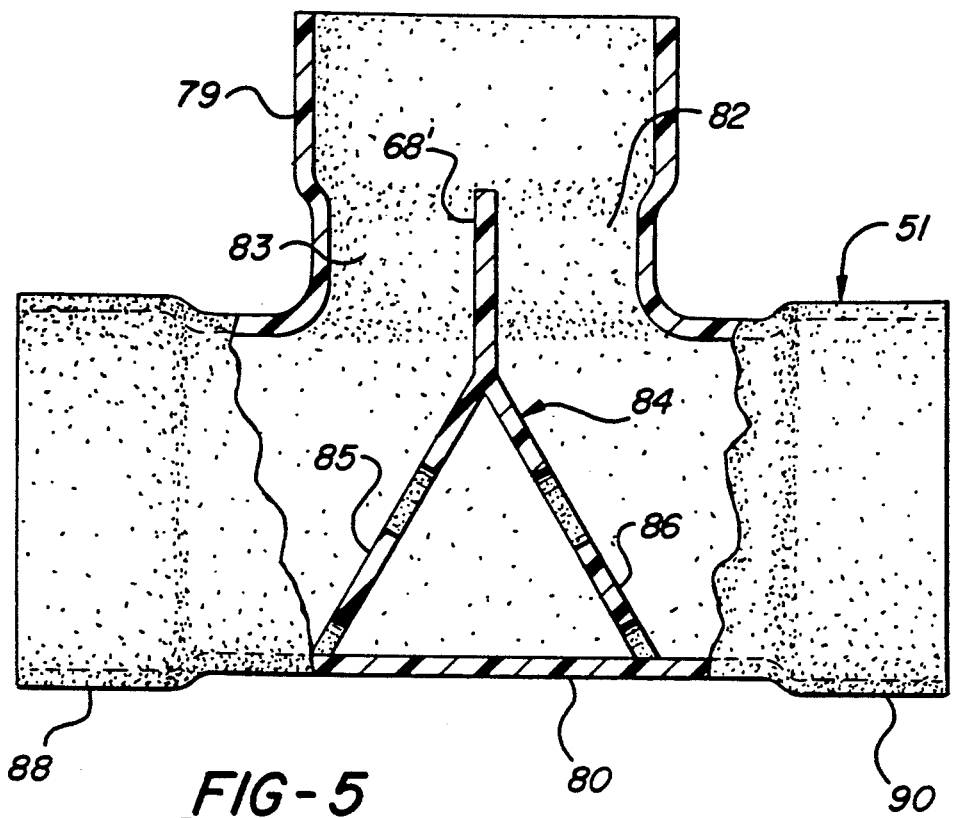
FIG. 5 is a partial cross section view of a baffled tee fitting.

FIG. 5 depicts a baffled tee fitting 51. As illustrated herein, the baffled tee 51 is a separate unit from the clean-out fitting 49 shown in FIGS. 2 and 3; although the two fittings could be fabricated as a unitary assembly. The tee fitting depicted in detail in FIG. 5 is shown as having a partition 68' longitudinally bisecting pipe 79 which forms the leg of this partition 68' can be a continuation of the partition 68 of the clean-out unit, or it can be a separate member. If the fittings are supplied as separate fittings, baffle tee fitting 51 may be formed either with or without a longitudinal partition 68'. In the embodiment shown in FIG. 5, partition 68' bisects leg 79 of tee fitting 51 so as to define fifth and sixth fluid passageways 83,82. A baffle 84 is positioned in a crossbar 80 of tee fitting 51 and has a first snake deflecting surface 85 and a second snake deflecting surface 86 which are inclined to fluid flow in respective first and second ends 88,90 of crossbar 80. The first snake deflecting surface 85 is also inclined to fluid flow in the fifth fluid passageway 83 and the second snake deflecting surface 86 is also inclined to fluid flow in the sixth fluid passageway 82.

While the baffle tee fitting 51 described in detail in the illustrated embodiment has a leg 79 and a crossbar 80 disposed at right angles to each other, the configuration of the tee fitting 51 could be changed so that the axes of the leg 79 and crossbar 80 are at a different angle to each other without departing from the spirit of the invention. However, it should be noted that the crossbar 80 of baffle tee fitting 51 is disposed approximately transversely to the leg 57 of clean-out pipe 49.

Persons versed in the art will also appreciate the baffle 84 in baffled tee fitting 51 could be positioned, for example, in the leg 79 rather than in the crossbar 80 without departing from the spirit of the invention, although such repositioning of the baffle 84 would only provide for deflecting a snake entering the baffled tee fitting 51 through either end 88,90 of crossbar 80; it would not deflect a snake entering baffle tee fitting 51 through leg 79.

Figure 6:
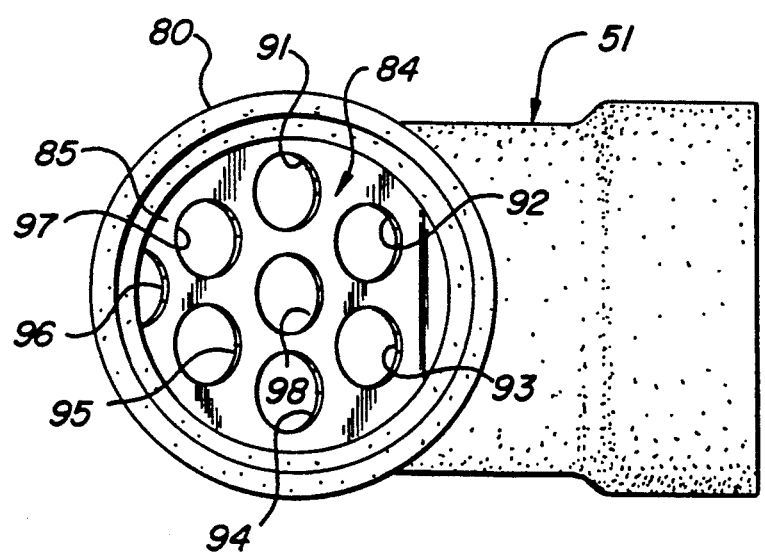
FIG. 6 is an end view of the baffled tee fitting shown in FIG. 5.

As shown in FIG. 6, which is a view from the end 88 of the tee fitting 51, the baffle 84 is illustrated as having a plurality of holes 91 through 98 extending through both the first snake deflecting surface 85 and the second snake deflecting surface 86. The size of the holes 91 through 98 is selected to be too small to permit a snake of the type usually used to clean the system 10 from passing through. The holes 91 through 98 are provided to permit fluid flow through the baffle 84 without interfering with the primary snake deflecting function of the baffle 84.

The operation of the snake cleanable fluid flow system will now be described with reference to FIGS. 1, 3 and 5, by assuming that there is a blockage believed to exist in the region of perforated pipe 17 and perforated pipe 23.

To remove such a blockage, a snake is inserted in the first passageway 64 of the partitioned pipe 57. The partition 60 cooperates with the side of the pipe 57 to guide the snake into the fourth fluid passageway 72. The snake will then pass into the continuation of fourth fluid passageway 72 formed by sixth fluid passageway 82 in perforated tee fitting 51. The snake then strikes the second snake deflecting surface 86 and is thus deflected out the second end 90 of crossbar 80 and passes out of the tee fitting 51 into perforated pipe 17.

If this does not remove the blockage, then the snake can be again inserted into the first fluid passageway 64 and directed into the third fluid passageway 70 in order to clean that part of pipe 23. Similarly, the other portion of pipe 23 can be cleaned by inserting the snake into the second fluid passageway 66 and thence directing it into either the third or fourth fluid passageways 68,72.

By referring to the fluid flow system 10 depicted in FIG. 1, it is apparent that if a snake of sufficient length is inserted in the second fluid passageway of partitioned pipe 57, it will pass in the manner aforedescribed through several elements in the interior drain apparatus to the sump basin 44. It is to be noted that the fluid flow system 10 depicted in FIG. 1 can be configured to include a storm water trap 100 of the type depicted in the insert in FIG. 1 instead of the sump pump 45 actually depicted. The storm water trap 100 will be connected to an appropriate sewer system. The present invention is equally useful with both types of system.

Since each section of the fluid flow system 10 functions in a similar manner to that aforedescribed, it is not necessary to describe the operation of each section. It suffices to note that if a snake is inserted in the first fluid passageway 64 of a partitioned pipe, the snake passes in the manner aforedescribed through either the third or fourth fluid passageway 70,72 of first end 76 of crossbar 49. It will then commence to pass out either first or second end 88,90 of crossbar 80 of the baffle tee fitting as described above. By knowing the configuration of the fluid flow system 10, a person can easily use a snake to clean all lines and fittings in the entire system 10. This can be accomplished by inserting a snake in the appropriate clean-out pipes 47 through 50 that are each provided within the interior of the building. There is thus no need to excavate any part of the fluid flow system 10, and the clean-out pipes 47 through 50 that are each provided within the interior of the building. The cleanout of the entire system can be easily accomplished in even the most adverse weather conditions. Normally, a suitable cover will be placed on top of each of the partitioned pipes 55 through 58 to prevent dirt or other contaminants from entering the same in a manner familiar to persons versed in the art. Since the clean-out pipes 47 through 50 are located in the interior of the building, the fittings will not be subjected to adverse weather conditions and should remain easy to remove over time.

Persons versed in the art will appreciate that various modifications of the apparatus incorporated in the fluid flow system may be made without departing from the spirit of the invention. For example, the various snake travel may be curved rather than straight to facilitate guiding and directing a snake in a predetermined direction in a manner similar to that described. Persons versed in the art will also appreciate that the partition in the partitioned pipes 55 through 58 may be perforated to provide fluid drainage and the exterior wall of pipes 55 through 58 may also be perforated to provide additional drainage. So long as such perforations do not permit the passage of a snake through the partitions 59 through 72 or through the walls of the partitioned pipes 55 through 58, such modification would not affect the operation of the system.

In light of the numerous modifications and variations of the foregoing system possible within the scope of the present invention, it will be appreciated that the drawings, discussions and descriptions presented herein are merely illustrative of particular embodiments of the invention and no limitations on the practice thereof. It is the following claims, including all equivalents thereof, which are meant to define the present invention.

I claim:

1. A snake cleanable drain system including a clean-out tee configured to have a tubular leg longitudinally bisected by a first interior wall to define first and second fluid passageways therethrough and a tubular crossbar in fluid communication with said tubular leg and longitudinally bisected by a second interior wall to define third and fourth fluid passageways therethrough, said first and second fluid passageways each being in fluid communication with both said third and fourth fluid passageways, wherein at least one of said first and second interior walls of said clean-out tee includes at least one perforation defined therein.

2. The drain system of claim 1 further including a baffled tee comprising a tubular leg in fluid communication with a tubular crossbar, said baffled tee being disposed so that the tubular leg thereof is in communication with an end of the tubular crossbar of the clean-out tee, the baffle being disposed so that a snake entering the tubular leg of the baffled tee via the third fluid passageway of said clean-out tee is deflected into a first arm of the tubular crossbar of the baffled tee and a snake entering the tubular leg of the baffled tee via the fourth fluid passageway of the clean-out tee is deflected into a second arm of the tubular crossbar of the baffled tee.

3. The drain system of claim 2 wherein the interior baffle of said baffled tee includes at least one perforation defined therein.

4. The drain system of claim 2 wherein the baffle is positioned in the crossbar of the baffled tee substantially at the intersection of said tubular crossbar and said leg of said baffled tee.

5. A drain system as in claim 2 wherein said baffle comprises a first and a second inclined surface, said surfaces meeting to form an acute angle therebetween.

6. A drainage system designed to direct a flow of ground water away from a building foundation, said system having at least one snake cleanable, clean-out pipe disposed in an interior of the building, said clean-out pipe comprising a tubular leg longitudinally bisected by a first interior wall to define first and second fluid passageways therethrough, and a tubular crossbar disposed in fluid communication with, and transverse to, the tubular leg and longitudinally bisected by a second interior wall to define third and fourth fluid passageways therethrough, said first interior wall terminating proximate said second interior wall at right angles thereto, and said first and second fluid passageways each being in fluid communication with both of said third and fourth fluid passageways so that a snake inserted into the first fluid passageway may be directed via one of the third and fourth passageways out a first arm of the crossbar and a snake inserted into the second passageway may be directed via one of the third and fourth passageways out a second arm of the crossbar, wherein at least one of said first and second interior walls of said clean-out tee includes at least one perforation defined therein.

7. The drainage system of claim 6 further comprising a tubular baffled tee fitting affixed to an end of the tubular crossbar of the clean-out pipe and in fluid communication therewith such that a tubular crossbar of the baffled tee fitting is disposed transversely to the tubular leg of the clean-out pipe, said baffled tee fitting having an interior baffle for deflecting a snake entering the tubular leg thereof via the third fluid passageway into a first arm of the tubular crossbar of the baffled tee fitting and a snake entering the tubular leg of the baffled tee via the fourth fluid passageway is deflected into a second arm of the crossbar of the tee fitting.

8. The drainage system of claim 7 wherein the baffle includes perforations defined therein to permit fluid flow therethrough.

9. The drainage system of claim 7 wherein the baffle is positioned in the crossbar of the baffled tee fitting substantially at the intersection of said crossbar with the leg of said baffled tee.

10. A clean-out pipe for a drain system, comprising:
a hollow, tubular tee fitting comprising a leg portion defining a first interior volume;
a crossbar portion defining a second interior volume in communication with said first interior volume;
a first interior wall disposed in the leg portion along the length thereof so as to longitudinally divide the first interior volume into a first and second fluid passageway;
a second interior wall disposed in the crossbar portion, along the length thereof so as to longitudinally divided the second interior volume into a third and a fourth fluid passageway;
said first and second interior walls being generally planar and disposed in intersecting planes to that said first fluid flow passageway communicates with said third and fourth fluid flow passageways and said second fluid flow passageway communicates with said third and fourth fluid flow passageways, wherein at least one of said first and second interior walls of said tubular tee fitting includes at least one perforation defined therein.

* * * * *